US012803387B2

(12) United States Patent
Borel et al.

(10) Patent No.: US 12,803,387 B2
(45) Date of Patent: Nov. 17, 2026

(54) SUCTION SYSTEM FOR EFFICIENTLY SUCKING UP THE DUST OF A ROTATING ELECTRIC MACHINE IN A POLLUTED ENVIRONMENT

(71) Applicants: MERSEN FRANCE AMIENS SAS, Amiens (FR); MERSEN ÖSTERREICH HITTISAU Ges.m.b.H., Hittisau (AT)

(72) Inventors: Grégory Borel, Salouel (FR); Michael Nathmann, Oberstdorf (DE)

(73) Assignees: MERSEN FRANCE AMIENS SAS, Amiens (FR); MERSEN ÖSTERREICH HITTISAU GES.M.B.H., Hittisau (AT)

( * ) Notice: Subject to any disclaimer, the term of this patent is extended or adjusted under 35 U.S.C. 154(b) by 267 days.

(21) Appl. No.: 18/703,096

(22) PCT Filed: Oct. 21, 2022

(86) PCT No.: PCT/FR2022/052001
§ 371 (c)(1),
(2) Date: Apr. 19, 2024

(87) PCT Pub. No.: WO2023/067290
PCT Pub. Date: Apr. 27, 2023

(65) Prior Publication Data
US 2024/0413712 A1 Dec. 12, 2024

(30) Foreign Application Priority Data
Oct. 22, 2021 (FR) ....................................... 2111250

(51) Int. Cl.
*H02K 9/26* (2006.01)
*H01R 39/48* (2006.01)

(52) U.S. Cl.
CPC ............... *H02K 9/26* (2013.01); *H01R 39/48* (2013.01)

(58) Field of Classification Search
CPC ........ H01R 39/38; H01R 39/48; H02K 13/10; H02K 9/26; H02K 9/28
(Continued)

(56) References Cited

U.S. PATENT DOCUMENTS 3,486,055 A * 12/1969 Lipstein .................... H02K 9/28 310/227
5,283,493 A * 2/1994 Hokanson .............. B60K 11/00 310/227
(Continued)

FOREIGN PATENT DOCUMENTS

EP 0971473 A2 * 1/2000 ............. H02K 5/148
EP 3 073 586 A1 9/2016
(Continued)

OTHER PUBLICATIONS

International Search Report for PCT/FR2022/052001 dated Feb. 13, 2023.
(Continued)

*Primary Examiner* — Alex W Mok
(74) *Attorney, Agent, or Firm* — Sughrue Mion, PLLC

(57) ABSTRACT

The invention relates to a suction system (10) intended to suck up dust generated by a brush (1) rubbing against a rotary element (3) of a rotating electric machine without sucking up the surrounding air. For this purpose, the suction system comprises a gas-ejection device (20) comprising at least one slot (21) opening out around at least a portion of the lower end (**12*a*) of a through housing (12) receiving a brush (1) or a brush holder (2) and around at least a portion of the opening (15) of a dust suction chamber (14**).
This slot is further configured to direct a gas flow exiting through the at least one slot in a direction away from the
(Continued)

opening of the suction chamber, thus forming an air curtain isolating the latter from the surrounding air.

18 Claims, 7 Drawing Sheets

(58) Field of Classification Search
USPC ........................................................ 310/56
See application file for complete search history.

(56) References Cited

U.S. PATENT DOCUMENTS

| | | | | |
|---|---|---|---|---|
| 10,931,173 | B2 * | 2/2021 | Baumeister | H01R 39/48 |
| 2008/0111440 | A1 * | 5/2008 | Schilling | H02K 9/28<br>310/228 |
| 2016/0279682 | A1 * | 9/2016 | Auzolle | B08B 5/04 |
| 2018/0083511 | A1 | 3/2018 | Baumeister et al. | |

FOREIGN PATENT DOCUMENTS

| | | | |
|---|---|---|---|
| JP | 61-35561 | U | 3/1986 |
| JP | 5-266957 | A | 10/1993 |

OTHER PUBLICATIONS

Written Opinion for PCT/FR2022/052001 dated Feb. 13, 2023.
Communication dated Feb. 18, 2026 in counterpart Indian Application No. 202437034306.

* cited by examiner

SUCTION SYSTEM FOR EFFICIENTLY SUCKING UP THE DUST OF A ROTATING ELECTRIC MACHINE IN A POLLUTED ENVIRONMENT

CROSS-REFERENCE TO RELATED APPLICATIONS

This application is a National Stage of International Application No. PCT/FR2022/052001 filed Oct. 21, 2022, claiming priority based on French Patent Application No. 2111250 filed Oct. 22, 2021, the entire disclosures of which are incorporated by reference herein.

FIELD OF THE INVENTION

The present invention relates to the field of brush holders and more particularly brush holders for rotating electric machines.

A brush holder device is a set of elements used to hold in place and guide a brush of a rotating electric machine, for example a motor or a generator.

TECHNOLOGICAL BACKGROUND

A brush, usually made from graphite, ensures the transmission of electrical power between a moving element and a fixed element.

The purpose of the brush holder device is to keep the brush in contact with the moving surface of the rotating electric machine, for example a commutator or a ring, by exerting a certain pressure on this brush. Usually, the pressure is provided via an elastic device such as a spring.

During operation of the electric machine, dust is generated due to the friction of the brush against the moving element. This dust is likely to lead to a deterioration in the surface condition of the commutator or the ring and/or mechanical jamming and/or electrical isolation defects. Systems for sucking up this dust have thus been developed, such as that described in document EP2532078B1 filed by the applicant, which comprises a guiding device arranged so as to concentrate a flow of air generated by the suction system in the vicinity of the brush end in contact with the rotary element. This guiding device defines a suction chamber partly surrounding the brush on the side of its end in contact with the rotary element of the machine. Other vacuum systems inject air near the end of the brush. This is the case of the suction system described in document GB1005433A which comprises on the one hand a suction duct located on one side of the brush, in the immediate vicinity thereof, to suck up the ionised air generated by the rotation of the machine, carrying with it the dust generated by the wear of the rubbing parts, and on the other hand an air admission duct located against the air suction duct, on one side opposite the brush, to send fresh air towards the end of the brush to replace the ionised air. Document EP3073586A1 describes a suction system comprising a chamber surrounding the end of the brush. Air is injected into this suction chamber through two inlets oriented towards this chamber in order to remove the dust from the brush and disperse it inside the chamber, allowing its extraction by suction via an outlet pipe. The chamber is positioned as close as possible to the rotating portion of the rotating machine in order to limit the dispersion of dust outside the chamber. Document US2018083511A1 describes a system for suction and cooling of a contact area between a brush and an electric machine ring. In this system, air is blown towards the ring and brush through a slot surrounding a suction chamber to remove dust from the ring by accelerating the fluid speed and direct it towards the suction chamber. The slot through which the air is blown is therefore oriented towards the opening of the suction chamber and therefore towards the housing receiving the brush (this housing being surrounded by the suction chamber). This blown air creates a flow sucking up the surrounding air, thereby improving dust collection while preventing particles from dispersing outside the system, as shown by the flow circulation shown in FIG. 6 of this document.

These suction systems thus have the disadvantage of also sucking up a portion of the air surrounding the brush. Indeed, due to their use in the immediate vicinity of a moving element, it is not possible to achieve a mechanical sealing between the chambers or suction ducts of these systems and the surrounding air. Furthermore, certain systems, such as that described in document US2018083511A1, suck up surrounding air to operate. However, this surrounding air can be loaded with pollutants which can degrade the suction system, in particular fouling the filters and/or being deposited on the surfaces with dust until causing the system to clog. Thus, when the surrounding air is polluted, and in particular by oily pollutants or water present in vaporised or dispersed form, or even particles generated in the environment of the machine (for example during the manufacture of cement or paper), the solutions proposed for effective dust evacuation are few in number. One solution consists of isolating the compartment containing the moving surface of the rotating machine and the brush, or even the entire machine, by means of a protective box and installing a "push-pull" type suction system which injects clean air inside the compartment and sucks it out of it. Another solution is to install a dust extraction system but with the risk of clogging described above and deterioration of the machine, which requires regular cleaning. Finally, in certain cases, the only solution retained is regular maintenance consisting of cleaning dust and pollutants deposited on the machine.

Systems dedicated only to cooling such as those described in document JPS6135561 are also known, wherein air is sent via a pipe surrounding a brush holder towards the rotary element. These systems do not provide for the suction of dust generated by the friction of the brush.

There is therefore a need for a simple suction system, easy to install and effective, even in polluted environments, and which is further compact.

DESCRIPTION OF THE INVENTION

A first object of the invention relates to a suction system intended to suck up dust generated by a brush rubbing against a rotary element of a rotating electric machine without sucking up the surrounding air, the system comprising:

- a through housing extending in a guiding direction and capable of receiving a brush or a brush holder in said guiding direction,
- a suction chamber having an opening intended to face the rotary element, said opening extending over at least a portion of the periphery of a lower end of the housing intended to be positioned facing the rotary element,
- a gas-ejection device comprising at least one slot opening out from the side of the lower end of the housing, the at least one slot extending around the lower end of the housing over at least a portion of the periphery of the latter and around at least a portion of the opening of the suction chamber and the at least one slot being configured to direct a gas flow exiting through the at least one slot in a direction away from the opening of the suction chamber.

"Direction away from the opening of the suction chamber" means a direction which deviates from the opening of the suction chamber, in other words, which is not directed towards it. Thus, the gas leaving through the at least one slot is not directed towards the housing intended to receive the brush but in a direction opposite to this housing. It is thus understood that the gas ejected with an appropriate volume flow rate is not, or only negligibly, sucked up by the suction chamber, unlike the configurations of existing suction systems. It is also understood that this ejection of the gas is obtained by the at least one slot oriented in a direction which deviates from the suction opening, in particular oriented in a direction opposite to this opening. In particular, a median direction of the at least one slot, in particular as defined below, deviates from the suction opening, in particular is directed in a direction opposite to this opening.

By the arrangement of the present invention, it is thus possible by ejecting the gas with an appropriate volume flow rate to form a gas curtain on at least a portion of the periphery of the opening of the suction chamber allowing to isolate this latter from pollution present in the air surrounding the suction system according to the invention. It is thus possible to install the suction system of the invention in a polluted environment, in particular by water or oily vapours or by particles generated in the environment of the machine, by limiting, or even eliminating, the risks of clogging. This surrounding air can thus be defined as the air located around the suction system, with the exception of the air located opposite the opening of the suction chamber. Thus, when the suction system is mounted on the electric machine, this surrounding air does not include the air located between the suction system and the rotary element of the electric machine at the area of contact of the brush with the rotary element.

The housing of the suction system according to the invention is capable of receiving a brush or a brush holder following the guiding direction. The article "a" must here be understood to mean "at least one". In other words, the housing of the suction system according to the invention is capable of receiving at least one brush or at least one brush holder in the guiding direction. The housing may in particular be capable of receiving one, two or more brushes, or one, two or more brush holders. Thus, in the remainder of the description, the expressions "a brush", "the brush", "of the brush", "a brush holder", "the brush holder", "of the brush holder" must be interpreted as meaning respectively "at least one brush", "the at least one brush", "of the at least one brush", "at least one brush holder", "the at least one brush holder", "of the at least one brush holder". When the housing is capable of receiving two or more brushes or brush holders, each brush or brush holder extends in said guiding direction. In a particular embodiment, the housing of the suction system according to the invention is capable of receiving a single brush or a single brush holder following the guiding direction.

According to the invention, the suction system comprises "a housing". The article "a" must here be understood to mean "at least one". In other words, the suction system may comprise at least one housing each receiving one or more brushes or brush holders. In this case, the housings can extend in distinct guiding directions and the opening of the suction chamber extends over at least a portion of the periphery of the lower ends of the housings intended to be positioned facing the rotary element. In a particular embodiment, the suction system may comprise at least one housing receiving at least one brush or brush holder. In another particular embodiment, the suction system may comprise a single housing receiving a single brush or brush holder.

The specific or non-specific embodiments which have just been described can be combined with all the embodiments described in the present application.

Note that the brush is not part of the suction system, but that the housing of the latter is intended to receive the brush during its use in a rotating electric machine. Moreover, although the suction system according to the invention is intended to suck up dust generated by a brush rubbing against a rotary element of a rotating electric machine, this suction is carried out by the suction chamber, the gas-ejection device partially isolating the suction chamber from the air located around the suction system thanks to the air ejected by the at least one slot oriented in a direction away from the opening of the suction chamber. Thus, the rotary element and the rotating electric machine are not part of the suction system according to the invention. On the other hand, a rotating electric machine comprising at least one brush rubbing against a rotary element can be equipped with at least one suction system according to the invention (one suction system for one or more brushes).

The at least one slot, and therefore its opening, extends over at least a portion of the periphery of the end of the housing. The at least one slot may extend in a preferred manner on an upstream side of the housing relative to the direction of rotation of the rotary element when the suction system is mounted on the electric machine, and on the adjacent lateral sides of the housing. Alternatively or in combination, the at least one slot can extend over at least a portion of the periphery of the housing over which the opening of the suction chamber extends, in other words along this opening.

In a preferred embodiment, the slot(s) of the gas-ejection device extend over the entire periphery of the lower end of the housing. The slot(s) then completely surround the opening of the suction chamber, for better isolation thereof from the surrounding air.

The through housing of the suction system allows easy assembly and guidance of the brush, either by directly positioning the brush inside the housing, the latter then forming part of a brush holder, or by positioning a brush holder, also called cage, inside the housing. The housing may thus have a shape complementary to a brush or a brush holder, typically a parallelepiped shape. The housing can in particular be formed by walls which form part of the suction chamber or which are secured thereto.

The guiding direction of the housing may correspond to a radial direction of the rotary element when the suction system is mounted on the rotating electric machine, this radial direction passing through a central point of a lower opening of the housing intended to be positioned opposite the rotary element when the suction system according to the invention is mounted on the electric machine. Alternatively, the guiding direction may comprise a radial component (the guiding direction then forms an angle with the radial direction previously defined in a plane perpendicular to the axis of rotation of the rotary element).

The opening of the suction chamber can extend over the entire periphery of the lower end of the housing or over only a portion thereof. In particular, this opening can extend over at least a portion of three sides of the housing when the latter has a parallelepiped shape, generally on one side intended to be positioned downstream of the brush relative to the direction of rotation of the rotary element, and on the two adjacent lateral sides.

The at least one slot can be defined by an interior lateral surface and an exterior lateral surface disposed facing each other. The width of the slot thus corresponds to the distance separating these interior and exterior lateral surfaces.

Advantageously, in order to keep the gas leaving through the at least one slot away from the opening of the suction chamber and the housing, the at least one slot can be configured, in particular oriented, so that, over the entire length of the at least one slot, in each plane perpendicular to the interior and exterior lateral surfaces of the at least one slot and parallel to a radial direction of the rotary element passing through a central point of a lower opening of the housing when the suction system is mounted on the electric machine, an angle α formed between a direction parallel to the radial direction and a median slot direction is (in absolute value) from 0° to 90°-phi, optionally from 1° to 50°-phi, this median slot direction being defined as a median straight line of two segments formed by the intersection of said plane with the interior and exterior lateral surfaces of the slot, phi (φ) designating an angle less than or equal to the angle between the direction parallel to the radial direction and the median direction of the slot, for example having a value of 0° to 25°. In one embodiment, the angle α can advantageously be from 1° to 45° or else from 15° to 45°, advantageously from 20° to 45°, more preferably from 20° to 40°, or in any interval defined by two of these limits, preferably greater than or equal to 1°, in particular non-zero. In a particularly advantageous embodiment, the angle α can be at least 5°, advantageously at most 15°, 20°, 40° or 45°.

In particular, where the at least one slot runs along the suction chamber, this angle phi corresponds to the angle formed between the direction parallel to the radial direction and an exterior lateral surface defining the suction chamber. In general, this angle phi is zero on the lateral sides of the suction chamber and non-zero on the upstream and/or downstream side of the suction chamber.

Therefore, along the suction chamber, the at least one slot is thus configured, in particular oriented, so that, in each plane as previously defined, the angle formed between the exterior lateral surface of the suction chamber and the median direction of the slot is from 0° to 90°, optionally from 1° to 50°, in particular non-zero.

Alternatively or in combination, it will be possible to define, in each plane as previously defined, a first angle βi formed between the direction parallel to the radial direction and the interior lateral surface of the at least one slot, and a second angle βe formed between the direction parallel to the radial direction and the exterior lateral surface of the at least one slot, and provide that each of the first and second angles is worth (in absolute value), independently, from 0° to 90°-phi, optionally from 0° to 45°-phi, phi (φ) being less than or equal to each of the first and second angles, and is for example from 0° to 25°. The value of each angle βi, βe can, independently, be from 0° to 90°, advantageously from 1° to 45° or else from 15° to 45°, advantageously from 20° to 45°, more preferably from 20° to 40°, or in any interval defined by two of these limits, preferably greater than or equal to 1°, in particular non-zero. Each of the angles βi and βe can, independently, be from 0° to 90°, advantageously from 0° to 45°, preferably from 1° to 45°, more preferably from 5° to 30° or in any other interval defined by two of these limits, preferably non-zero. In a particular embodiment, the angle βi can be from 5° to 90°, advantageously from 5° to 45°, preferably from 5° to 30°, or in any other interval defined by two of these limits, and the angle βe is then from 0° to 90°, advantageously from 5° to 45°, preferably from 5° to 30°, or in any other interval defined by two of these limits, preferably non-zero.

Therefore, along the suction chamber, the at least one slot can thus be configured, in particular oriented, so that, in each plane as previously defined, the angle α formed between the exterior lateral surface and the slot median direction is from 0° to 90°, optionally from 1° to 50°. In one embodiment, the angle α can advantageously be from 1° to 45° or else from 15° to 45°, advantageously from 20° to 45°, more preferably from 20° to 40°, or in any interval defined by two of these limits, preferably greater than or equal to 1°, in particular non-zero. In a particularly advantageous embodiment, the angle α can be at least 5°, advantageously at most 15°, 20°, 40° or 45°. Similarly, the first and second angles βi, βe previously defined can then be defined no longer with respect to the direction parallel to the radial direction, but with respect to the exterior lateral surface of the suction chamber, their respective values being then as mentioned above but without subtracting the value of the angle phi.

Generally speaking, the median direction Dm of a slot as defined above thus corresponds to the direction of the gas flow leaving the slot.

In general, regardless of the embodiment of the slot and/or the suction system, the radial direction Ar corresponds to a direction of the suction system which is defined as a straight line perpendicular to a plane defined by the opening of the suction chamber (for example a plane containing at least two opposite edges of this opening) and passing through the centre C of this opening. This direction of the suction system can thus be coincident with the direction D1 of the housing when the angle phi is zero or be inclined relative thereto when the angle phi is non-zero. When several housings, for example two housings, with distinct guiding directions are provided, this direction of the suction system is generally a median of the guiding directions of the housings. The various aforementioned angles can thus be defined with respect to this direction of the suction system when the suction system is not mounted on a rotating electric machine.

The at least one slot can have a width of 0.1 to 20 mm, advantageously 0.2 to 5 mm or even 0.2 to 2 mm or in any interval defined by two of these limits. Such widths can facilitate the formation of a gas curtain with an appropriate gas volume flow rate.

This width of the at least one slot may be constant over the entire length of the slot or vary continuously or not.

Advantageously, the at least one slot can in particular have a variable width over its length and/or at least two distinct slots can have different widths, which can allow to obtain a substantially constant volume flow rate of gas over the entire length of the slot(s). Thus, a portion of the at least one slot closest to a gas admission orifice supplying the at least one slot may be narrower than the rest of the at least one slot and/or than an adjacent slot. Alternatively or in combination, a portion of the at least one slot closest to a gas suction orifice of the suction chamber may be wider than the rest of the at least one slot and/or than an adjacent slot.

The gas-ejection device may have a single slot or two or more slots disposed in the extension of one another (end to end). In the latter case, this can allow to reinforce the structure of the ejection device, the separations between the slots serving as reinforcement points. These separations are, however, preferably short enough so that a gas exiting through these slots forms a continuous or substantially continuous gas curtain along the slots despite the presence of these separations. To this end, the sum of the distances separating two adjacent slots can be from 0.1 to 5% of the sum of the lengths of the slots, advantageously from 0.5 to 1.5% or in any interval defined by two of these limits.

Advantageously, the gas-ejection device may comprise at least one gas admission orifice in fluid communication with the at least one slot. In particular, this gas admission orifice can be connected to a gas admission system, via a flexible or rigid pipe. This gas admission system may in particular comprise a gas source (tank, network or surrounding air) and a device for regulating the pressure or gas flow injected into the at least one slot. This regulation device may comprise a compressor, a fan, a pneumatic network, a regulation valve, or several of these elements. The admission system may further comprise a gas filtration system.

The gas-ejection device may comprise a gas admission chamber fluidly connected to the at least one slot and to at least one gas admission orifice. This gas admission chamber can then serve as a gas reservoir. It can ensure a slight gas overpressure constantly, thus facilitating the regulation of the volume gas flow ejected through the slot.

For a compact suction system, the admission chamber may be adjacent to the suction chamber and extend, at least partly, along an exterior lateral wall of the suction chamber and/or along an upper wall of the suction chamber.

Typically, the suction chamber may have at least one gas suction orifice for connection to a suction group via a flexible or rigid pipe. A suction unit is a device allowing to generate an air suction flow. This suction group can be a suction group of the type used in clean rooms. This device, well known to the person skilled in the art will not be further defined.

In order to make the suction system more compact, a single gas admission orifice and a single gas suction orifice connected to the suction chamber can be provided, these orifices being preferably located on opposite sides relative to the housing, whether there is an admission room or not.

The suction system according to the invention can be made in one piece or not. The gas-ejection device and the suction chamber can be separate parts assembled together. This assembly can result from fitting, gluing, screwing, riveting or the like. The production of separate parts can in particular allow to equip existing suction systems with a gas-ejection device.

Advantageously, the gas-ejection device can be formed of at least two distinct portions assembled together, a portion defining an exterior lateral surface of the at least one slot, and optionally at least a part of the admission chamber when it is present, and the other portion defining an interior lateral surface of the at least one slot, optionally the suction chamber and/or the rest of the admission chamber when it is present. This can facilitate the production and assembly of the gas-ejection device.

The suction system according to the invention can be made of an antistatic material or of any material covered with an antistatic coating. In particular, it can be made of an electrically isolating material resistant to the heat generated by the operation of the machine. The material used is advantageously a non-conductive material and resistant to temperatures of at least 110° C. It may for example be an acetal or polyamide resin.

The invention also relates to a method for sucking up dust generated by a brush rubbing against a rotary element of a rotating electric machine without sucking up the surrounding air by means of a suction system according to the invention, wherein, at least during the suction of gas through the suction chamber, the at least one slot of the suction system is supplied with a volume flow rate of gas sufficient to form a gas curtain isolating the opening of the suction chamber from the surrounding air.

Typically, the gas supplying the at least one slot is air although an inert gas is also possible (argon, nitrogen). The air may then have been previously filtered.

The at least one slot of the suction system can be supplied with gas through at least one gas admission orifice or through a gas admission chamber connected to at least one gas admission orifice, as described above.

Advantageously, the gas pressure inside the admission chamber can be greater than the gas pressure inside the suction chamber. In particular, it will be possible to choose this pressure difference between the two chambers sufficiently high, in particular greater than or equal to a predetermined value, to prevent the surrounding air from passing through the gas curtain and reaching the opening of the suction chamber. The person skilled in the art will be able to determine the minimum pressure difference to be applied by tests and/or simulations. Typically, a pressure difference of at least 150 mbar, preferably at least 200 mbar, or even at least 250 mbar can be applied, for example from 150 mbar to 300 mbar. Usually, the suction chamber pressure is negative (vacuum), while the admission chamber pressure is positive.

In the absence of an admission chamber, a pressure difference can be applied between the interior volume of the at least one slot and the suction chamber. Advantageously, the dust-laden gas contained in the suction chamber can be sucked up by means of a suction unit and at least a portion, or even all, of the gas thus sucked up can be used after passing through a filtration system to supply the at least one slot of the suction system. The gas sucked up, after the elimination of the dust contained therein, can thus be reused to form the air curtain.

The invention also relates to a rotating electric machine equipped with at least one suction system according to the invention, the electric machine comprising at least one brush rubbing against a rotary element. In particular, the at least one brush is received in the through housing of the suction system following the guiding direction. In particular, the latter corresponds to the radial direction of the rotary element or is inclined relative to the latter by the angle phi ($\varphi$).

"Rotating electric machine" means any device comprising at least one brush which will rub on a rotary element, in particular a direct current motor, a synchronous generator, a grounding device to evacuate leakage currents, or else a signal or power transfer system.

The rotary element can be a rotor, a rotating shaft, a ring mounted on a rotating shaft, a commutator or a slip-ring of a winding, or the like. Conventionally, brushes (or "carbon brush", this expression also covering the case of brushes not comprising carbon), or brushes (also "fiber brush") mounted on a crown (also called "rocker") fixed via brush holders, and pressed against the rotary element ensures the transfer of current between this rotary element and cables connected to brushes, these cables being electrically connected to a fixed element. The fixed element can be a stator, a fixed coil, fixed equipment electrically connected to the brush cables, or the like.

DESCRIPTION OF THE FIGURES

The invention is now described with reference to the appended, non-limiting drawings, wherein.

Substantially parallel means a direction parallel to or deviating by at most ±20°, or even by at most ±10° or by at most ±5° from a parallel direction.

Suction System

Figure 1:
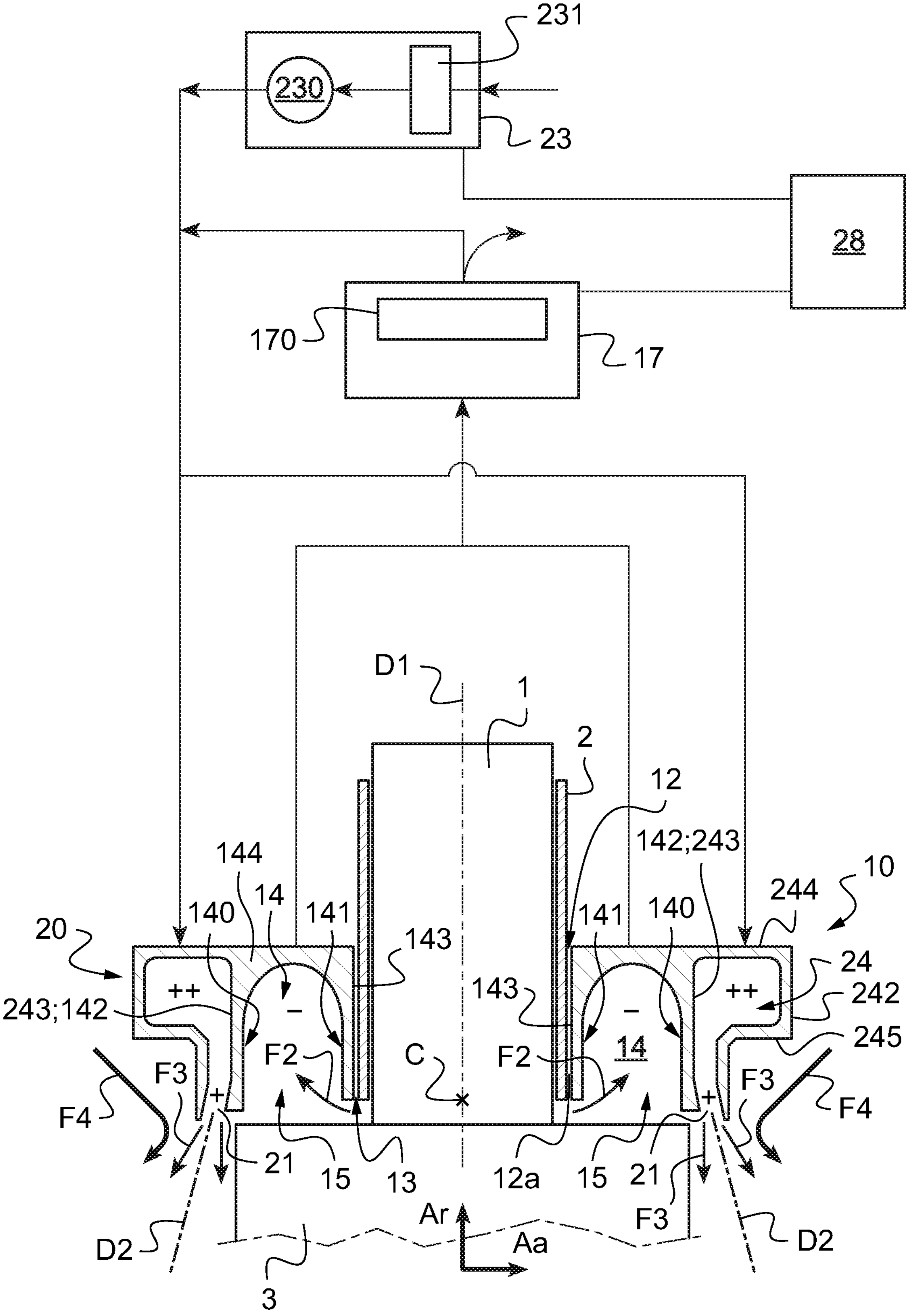
FIG. 1 schematically shows in section in a plane (Ar, At) a suction system according to one embodiment of the invention.
Figure 2:
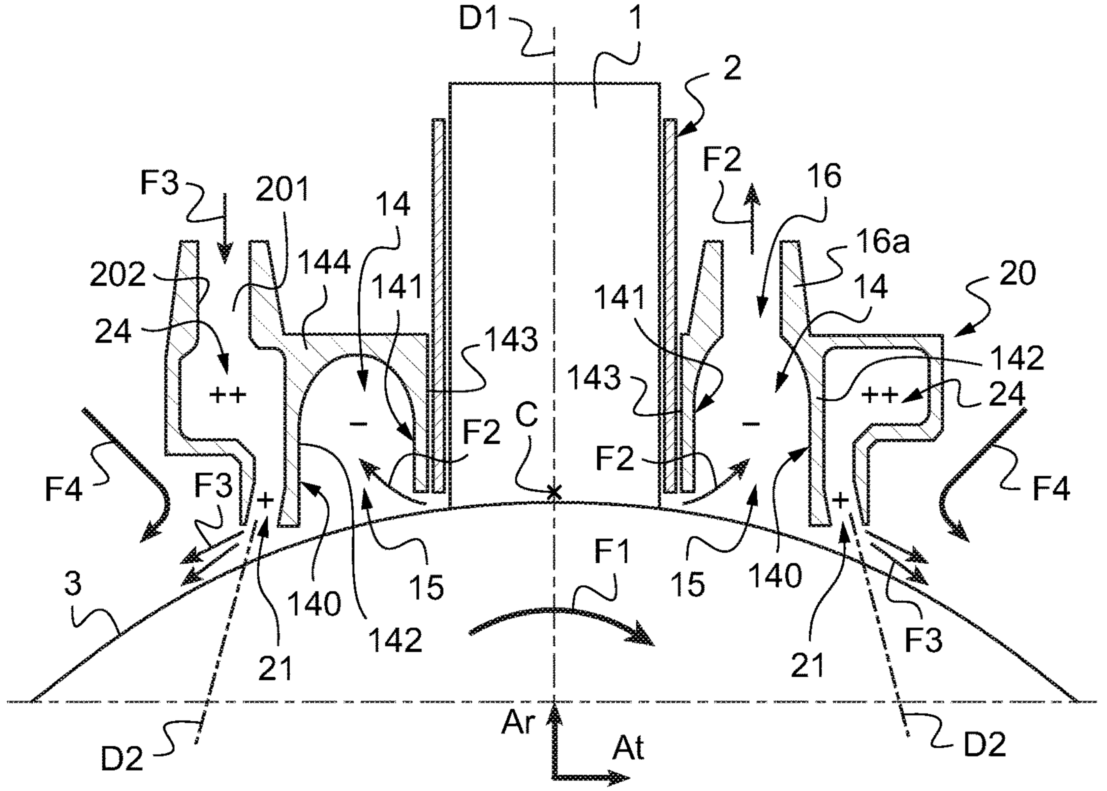
FIG. 2 schematically shows the suction system of FIG. 1 in section in a plane (Ar, Aa) perpendicular to the plane (Ar, At).
Figure 3:
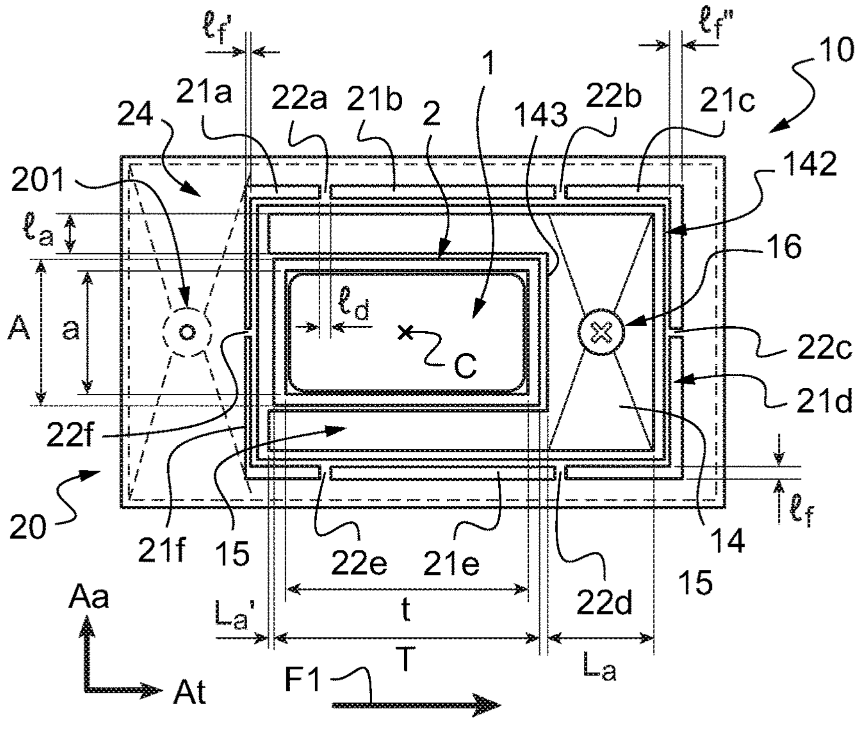
FIG. 3 shows a bottom view of a suction system (in a plane (Aa, At)) according to another embodiment.

FIGS. 1-3 show a suction system 10 intended to suck up dust generated by a brush 1 intended to rub on a rotary element 3 of a rotating electric machine when it is mounted on the latter.

The rotary element 3 rotates in a direction of rotation represented by the arrow F1 in the figures. In the present description, the suction system being mounted on the rotating electric machine, "upstream and downstream sides" designate the sides of the suction system, in a plane perpendicular to the axis of rotation of the rotary element, through which a fixed point of the rotary element enters and exits, respectively, when it rotates. In the plane of FIGS. 1 to 3, the upstream and downstream sides therefore respectively designate the sides of the suction system located to the left and right of the brush 2.

The brush 1 is here held by a brush holder 2, generally called a brush holder cage. The brush 1 and its cage 2 are received in a through housing 12 of the suction system 10, this through housing 12 extending in a guiding direction D1. When the suction system 10 is mounted on a rotating machine, as shown in FIGS. 1 and 2, this guiding direction D1 can correspond to a radial direction Ar of the rotary element 3 passing through a central point C of the lower opening 13 of the housing. In the mounting position, the brush 1 is in contact with the rotary element 3 on the side of a lower end 12*a* of the housing. Typically, the brush 1 projects out of the housing 12 on the side of the lower opening 13 in the guiding direction D1.

In the figures, the axis Ar thus shows the radial direction of the rotary element of the rotating machine wherein the brush passing through the central point C is mounted, the axes Aa and At define a plane perpendicular to the axis Ar and correspond to perpendicular transverse directions, the axis Aa being parallel to the axis of rotation of the rotary element 3.

Figure 5:
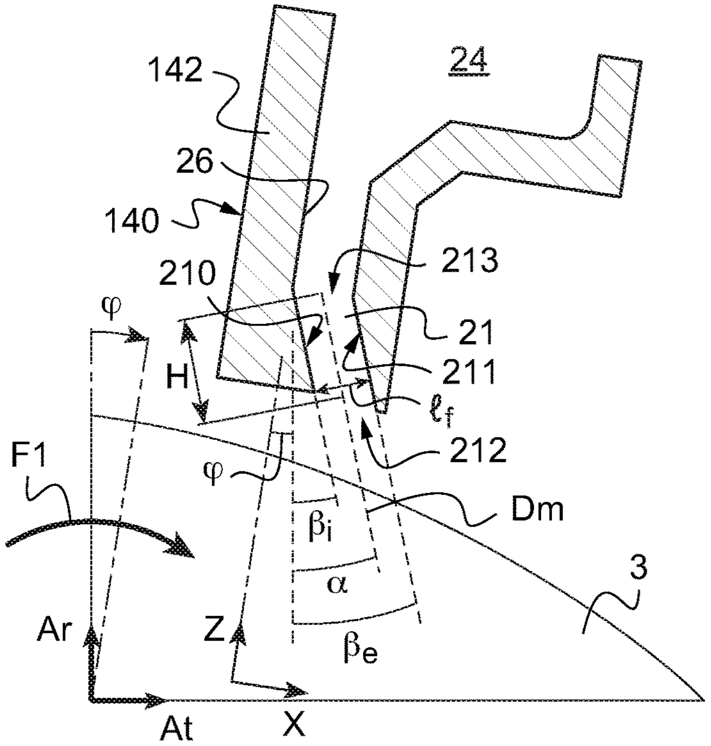
FIG. 5 shows a sectional view of another slot configuration.

In a variant shown in FIG. 5, the guiding direction D1 of the brush (corresponding to the axis Z of FIG. 5) is inclined relative to the radial direction Ar in the plane (Ar, At) by an angle phi (φ), particularly downstream with respect to the rotation of the rotary element 3.

The suction system 10 also comprises a suction chamber 14 having an opening 15 located opposite the rotary element 3 in the mounting position of the suction system (FIG. 1, 2). This opening 15 extends over at least a portion of the periphery of the lower end 12*a* of the housing. In the example shown in FIGS. 1 and 2, the opening 15 extends over the entire periphery of the housing 12. In the example of FIG. 3, the opening 15, as well as the suction chamber 14, extend on a downstream side of the housing relative to the direction of rotation of the rotary element 3 (symbolized by the arrow F1 FIG. 3), and on the two adjacent lateral sides, thus forming a U shape (in the plane (Aa, At)) open upstream relative to the direction of rotation of the rotary element 3. The invention is however not limited by a particular shape of the suction chamber 14 and the opening 15, which could have not parallelepiped shapes as in the example, but rounded shapes (curved, oval or round) in the plane (Aa, At).

The housing 12 here has a parallelepiped shape corresponding to a typical shape of a brush or a brush-holder cage. The invention is however not limited to a particular shape of the housing provided that it can receive a brush or its cage, this shape being typically complementary to the shape of the brush or its cage. In an embodiment not shown, the housing 12 can be configured to receive more than one brush or more than one brush holder cage. The housing can then have as many guiding directions as there are brushes, these guiding directions being generally parallel to each other. It is also possible to provide several separate housings which are then surrounded at least partly by the opening of the suction chamber.

Generally, the suction chamber 14 is defined by at least one exterior lateral surface 140 and at least one interior lateral surface 141, which respectively form part of an exterior lateral wall 142 and an interior lateral wall 143. The interior lateral wall 143 is closest to the housing 12, the exterior lateral wall 142 is farthest from the housing 12. These lateral walls 142, 143 extend substantially parallel to the guiding direction D1 and are connected by an upper wall 144 on a side opposite the opening 15.

The interior lateral wall 143 can define the housing 12, as visible in FIGS. 1 and 2. As can also be seen in these figures, the exterior lateral wall 142, here its upstream and downstream sides visible in the view of the plane (Ar, At) (FIG. 2), can have a height, measured in the radial direction Ar, greater than the height of the interior lateral wall 143, in particular on the side of the lower end 12*a* of the housing, which allows to position it as close as possible to the rotary element 3. As shown in FIG. 5, the exterior lateral wall 142 (here its downstream side, visible in the view of the plane (Ar, At)) can further be inclined relative to the radial direction Ar so that the exterior lateral surface 140 forms an angle phi (φ) with the radial direction Ar. Typically, this angle phi is from 0 to 25°. In this case, the height of the exterior lateral wall 142 can be measured in the plane of the exterior lateral surface 140 in a direction defined by the intersection of the plane (Ar, At) with this exterior lateral surface 140. This inclination of an angle φ of the exterior lateral wall 140 allows to maintain the opening 15 of the suction chamber and the adjacent outlet orifice of the slot close to the rotary element 3, thus improving the efficiency of the gas curtain formed as well as the dust suction efficiency.

Generally speaking, the exterior lateral wall 142 can be inclined and/or its height can be increased on its upstream and/or downstream sides, in order to be positioned as close as possible to the rotary element 3 and to follow its curvature (see FIGS. 2 and 5).

The distance separating the rotary element 3 from the opening 15 of the suction chamber or from the outlet orifice of the slot(s) is typically 2 mm or more, for example 2 to 5 mm.

The invention is however not limited by a particular shape of the suction chamber 14 nor of its opening 15, provided that the latter allow evacuation of the gases sucked up through the opening 15, in particular via one or more suction orifices. In the example shown in FIG. 3, the opening 15 has a width (corresponding to the distance separating the interior 141 and exterior lateral surfaces 140 of the suction chamber 14) which varies on the periphery of the housing 12, with a width La on the downstream side of the opening larger on the side of the suction orifice 16 than the width 1*a* of the opening 15 on its lateral sides. For efficient dust evacuation, the opening 15 of the suction chamber is thus wider on the side where the wear dust of the brush is ejected when the rotary element rotates, that is to say on the side where the amount of dust ejected is the most significant.

The suction chamber 14 typically includes at least one suction orifice 16, here only one, for connection to a suction group 17 via a flexible or rigid pipe. This suction group 17 can be equipped with a filtration system 170. In the example, the suction orifice 16 is extended by a duct 16*a* made in one piece with the suction chamber 14 (FIG. 2). The suction orifice(s) 16 are typically located on the upper wall 144 of the suction chamber.

According to the invention, the suction system 10 has a gas-ejection device 20, generally air, comprising at least one slot 21 opening out on the side of the lower end 12*a* of the housing and extending around the lower end 12*a* of the housing over at least a portion of its periphery and around at least a portion of the opening 15 of the suction chamber, preferably over the entire periphery of the housing, as shown in FIG. 3.

In the example of FIG. 3, a plurality of slots 21*a*, 21*b*, 21*c*, 21*d*, 21*e*, 21*f* extend in the extension of each other (end to end), over the entire periphery of the lower end 12*a*, separated from each other by thin separations 22*a*, 22*b*, 22*c*, 22*d*, 22*e*, 22*f*. The invention is not limited to a particular number of slots. When two or more slots are present, each separation, or discontinuity, between two slots may have a length of 0.05 to 2 mm, advantageously 0.1 to 1.5 mm. When several discontinuities are present, they can be of the same length. In particular, it will be possible to define a percentage of discontinuities corresponding to the ratio of the total length of the discontinuities to the sum of the lengths of all the slots, which could be from 0.1% to 5%, advantageously from 0.5% to 1.5% or in any interval defined by two of these limits. These separations or discontinuities can advantageously be located in the immediate vicinity of the outlet orifice of the slots, and extend over the entire height of a slot or over a portion of this height (according to the definition given below).

According to the invention, the slot(s) are configured, in particular oriented, to direct a gas flow exiting through this or these slot(s) in a direction D2 away from the opening 15 of the suction chamber 14. These slots are thus oriented in a direction deviating from the opening of the suction chamber 14, in other words in a direction opposite to this opening 15. By definition, a slot is a narrow and long opening, more or less deep, in other words having a greater or lesser height.

The use of slot(s) having an orientation as previously described relative to the opening of the suction chamber to eject gas allows to create a curtain of gas (typically air) along the suction chamber, preferably over the entire periphery of the housing 12, allowing to isolate the suction chamber 14 from the surrounding air and the pollutants it contains. The orientation of the slots in a direction away from the opening 15 of the suction chamber, and therefore from the housing 12, avoids, or at least limits, suction by the suction chamber 14 of the gas ejected by the slot(s). This arrangement allows to effectively protect the suction system from a polluted surrounding atmosphere, as shown in the simulations presented below in the examples.

Typically, the gas-ejection device 20 may comprise at least one gas admission orifice 201 in fluid communication with the at least one slot 21 for connection to a gas admission system 23, via a flexible or rigid pipe. In the example, the gas admission orifice 201 is extended by a duct 202. In the example, the gas admission system 23 further comprises a gas source, here the surrounding air, a device for regulating the pressure or flow of injected gas 230 and a filtration system 231 for the injected gas. It may also be possible to return a portion or all of the air sucked up by the suction group 17 into the gas admission system 23, after passing through a filtration system 170 allowing to rid it of dust, as shown in FIG. 1. For this purpose, the filtration system 170 can be connected by one or more appropriate pipes directly to the gas admission system 23 or to the pipes connecting the latter to the at least one slot of the gas-ejection device 20.

Figure 10:
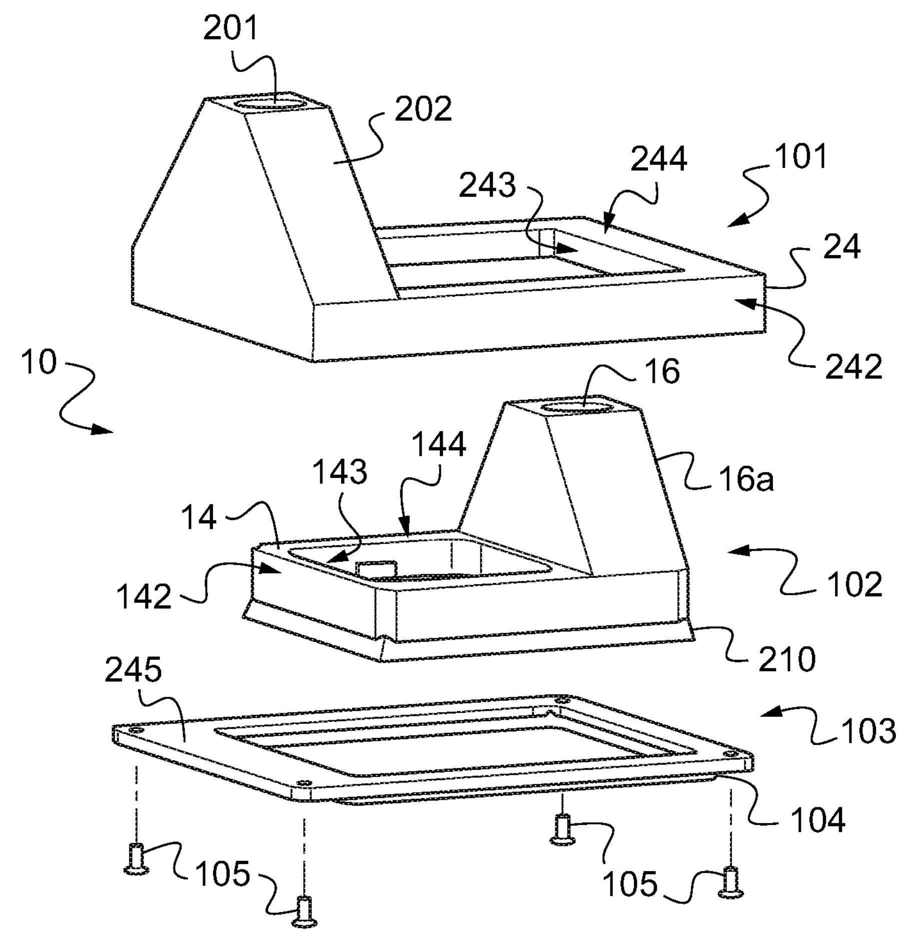
FIG. 10 shows an exploded perspective view of a suction system according to one embodiment.

The suction system 10 according to the invention can be produced in a single part, for example by 3D printing, or in several parts, as shown in FIG. 10. In this figure, the suction system 10 is formed of three parts 101, 102, 103. The part 101 comprises the gas admission orifice 201, the duct 202 connecting this orifice to the gas admission chamber 24 and at least a portion of the admission chamber 24. The duct 202 here has a pyramidal shape. The portion of the part 101 corresponding to the admission chamber 24 has the shape of a frame. The part 102 comprises the suction chamber 14 (and its opening 15), the suction orifice 16 and the duct 16*a*, also pyramidal in shape. Furthermore, the lower portion of the exterior lateral wall 142 of the suction chamber 14 forms the interior lateral surface 210 of the slots 21 or 21*a*-21*f* and a portion of the admission chamber 24.

The part 102 fits inside the part 101, the exterior lateral wall 142 of the suction chamber being positioned in airtight support against the interior lateral wall 243 of the admission chamber 24.

Finally, the part 103, in the shape of a frame, comprises the lower lateral wall 245 of the admission chamber and includes a wall 104 forming the exterior lateral surface 211 of the slots 21 or 21*a*-21*f*. The part 103 thus partially closes the admission chamber 24 and ensures the fixing of the three parts, for example via fixing screws 105 assembling the part 103 to the part 101.

Alternatively, the exterior lateral wall 242 of the admission chamber 24 of the part 101 could form the exterior lateral surface 211 of the slots 21 or 21*a*-21*f*. The parts 101 and 103 could then be mounted on existing parts 102. Note that parts 101 and 103 could be integral or form a single part.

At least one brush wear detection sensor can be integrated into the suction chamber and/or the admission chamber. In particular, this sensor will be positioned as close as possible to the lower end of the housing or in an upper portion thereof.

FIGS. 1 and 2 show the directions of the circulating flows when the rotary element 3 of the electric machine rotates in the direction of arrow F1. During this suction, a suction flow generated by the suction group 17 and symbolised by the arrows F2 sucks up the air and dust located in the immediate vicinity of the end of the brush rubbing against the rotary element 3 and evacuates them via the suction chamber 14, the orifice 16 and its duct 16*a*. Simultaneously, an air flow generated by the air admission system 23 is routed to the slots 21 via the admission orifice 201 and its duct 202 and the admission chamber 24. These air flows are symbolised by the arrows F3. They are directed in a direction away from the opening 15 of the suction chamber 14 and in particular in the plane (Ar, At) are further deviated towards the outside by the presence of the rotary element 3. These air flows F3 allow to deflect the air flows from the environment (symbolised by the arrows F4) in a direction opposite to the suction system 10 protecting the latter from pollutants possibly present in the environment. As shown in the examples presented below, the air curtain thus formed allows to avoid suction of the surrounding air without itself being sucked up.

Management System

It will also be possible to provide a management system 28 of the suction group 17 and the gas admission system 23 configured to control the volume flow rates and/or the pressures delivered by the suction group and the gas admission system.

This management system 28 may comprise calculation and transmission means such as a processor, for example a microprocessor, a microcontroller or the like. The calculation and transmission means can be programmed for:

- calculating pressure and/or volume flow rate setpoint values for the gas flows sucked up and ejected, and
- transmitting these setpoint values to corresponding adjustment means of the suction group and the admission system.

These setpoint values can in particular be calculated in order to maintain a volume flow rate of gas sufficient to form a gas curtain isolating the opening of the suction chamber from the surrounding air, advantageously to maintain a gas pressure inside the admission chamber higher than the gas pressure inside the suction chamber, especially with a particular pressure difference.

These adjustment means can be devices for regulating the pressure or a gas flow rate.

The management system 28 can also comprise monitoring means, which are in particular automated:

- of the suction group 17 and the admission system 23, for example detection of filter clogging or a pressure sensor (verification that there is no deviation from the setpoint value), and/or
- of the rotating electric machine, for example to monitor via sensors the temperature of the air surrounding the rotary elements, the wear of the brushes, the current passing through the brushes, the starting or stopping of the machine.

The management system 28 can thus be configured to control the starting and stopping of the suction group 17 and the admission system 23, simultaneously or not (for example stopping the suction system 15 minutes after the stopping the rotating machine then stopping the admission system 5 minutes later).

Slot Configurations

Different slot configurations allow to direct a gas flow exiting through a slot in the direction D2 away from the opening 15 of the suction chamber 14.

A slot outlet orifice 212 corresponding to the orifice through which a slot opens onto the side of the rotary element 3 and a slot inlet orifice 213 through which the gas enters inside the slot will also be defined.

Examples of possible configurations are described with reference to FIGS. 4A to 4C and 5. These embodiments apply both to a configuration having a single slot and to a configuration having two or more slots. Different slots may have different configurations. In particular, the different embodiments described below can be combined.

Figure 4A:
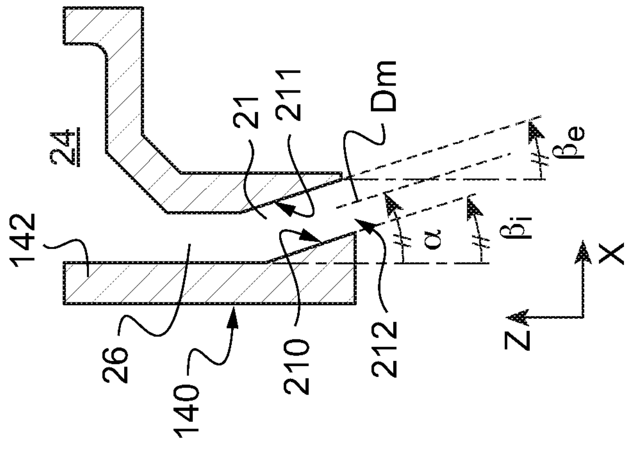
FIGS. 4A to 4C show sectional views of different slot configurations.
Figure 4B:
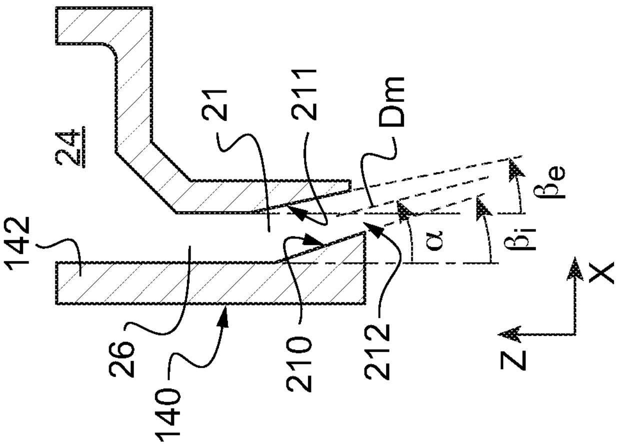
Figure 4C:
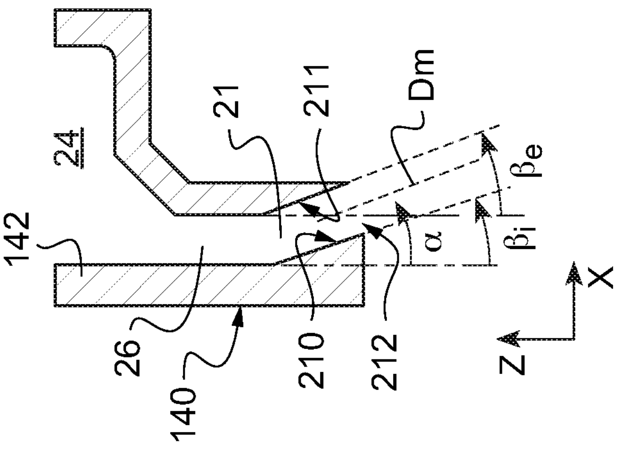

Generally speaking, each slot 21 is defined by an interior lateral surface 210 and an exterior lateral surface 211 disposed facing each other. The interior lateral surface 210 is closest to the housing 12, the exterior lateral surface 211 is furthest from the housing 12. In FIGS. 4A-4C and 5, the direction Z is parallel to the exterior lateral surface 140 of the suction chamber. The reference frame (Z, X) is in FIG. 5, inclined by an angle φ relative to the reference frame (Ar, At), in the plane of (Ar, At). In FIGS. 4A-4C, the reference frame (Z, X) is coincident with the reference frame (Ar, At). In the plane (Ar, Aa), the angle phi is generally zero, in other words, on its lateral sides (substantially parallel to the direction At), the exterior lateral surface 140 of the suction chamber is parallel to the radial direction Ar (as shown in FIG. 1).

The angles α, βi and βe described below as well as the median direction Dm are defined in each plane perpendicular to the interior 210 and exterior 211 lateral surfaces and which is parallel to the radial direction Ar passing through the central point C (visible in FIGS. 1-3) of the lower opening of the housing when the suction system is mounted on the electric machine. The angle values given are absolute values.

An angle alpha (α) can then be defined, when the angle phi is zero, as the angle formed between the exterior lateral surface 140 of the suction chamber 14 and a median slot direction Dm, defined as a median straight line of two segments formed by the intersection of the previously defined plane with the interior 210 and exterior 211 lateral surfaces of the slot. This median direction Dm corresponds, in particular substantially, to the second direction D2 wherein the gas is ejected at the outlet of a slot. This median direction thus corresponds to the orientation of the slot.

It is also possible to define, when the angle phi is zero, angles beta i (βi) and beta e (βe), formed between the exterior lateral surface 140 of the suction chamber and, respectively, the interior lateral surface 210 of slot and the exterior lateral surface 211 of the slot.

The angle α is thus comprised between the angles βi and βe. The angle α can be from 0° to 90°, advantageously from 1° to 45° or in any interval defined by two of these limits.

These angles α, βi and βe can be equal (interior 210 and exterior 211 lateral surfaces of the slot being parallel), as shown in FIG. 4A or 5. The median direction Dm is then parallel to the lateral surfaces of the slot. The value of the angle α=βi=βe can be from 0° to 90°, advantageously from 1° to 45° or else from 15° to 45°, advantageously from 20° to 45°, more preferably from 20° to 40°, or in any interval defined by two of these limits, preferably greater than or equal to 1°, in particular non-zero.

The angles βi and βe can be different as shown in FIGS. 4B and 4C.

In FIG. 4B, the interior 210 and exterior 211 lateral surfaces of the slot converge towards the outlet orifice 212 of the slot, in other words, βi>βe. This allows to increase the speed of ejection of the gas at the outlet of the slot (compared to the configuration of FIG. 4A with the same volume flow rate of gas and the same width of the outlet orifice of the slot) and to improve the precision of gas ejection direction.

In FIG. 4C, the interior 210 and exterior 211 lateral surfaces of the slot diverge towards the outlet orifice 212 of the slot, in other words, βi<βe. The gas is then ejected with a lower speed (compared to the configurations of FIGS. 4A and 4B with the same volume flow rate of gas and the same width of the outlet orifice of the slot) but in a cone. This embodiment can generate turbulence outside the slot, values of angles and width of the outlet orifice 212 allowing to limit this turbulence can then be chosen, for example by means of simulations and/or of tests. For example, βi=18° and βe=29° can be chosen.

In all cases, βe is at most 90°.

FIG. 5 represents a configuration similar to FIG. 4A, wherein the wall 140 is inclined at an angle phi relative to the radial direction. The angles α, βi and βe are then defined with respect to the radial direction of the rotary element, the angle α being defined between the radial direction Ar and the median direction Dm, the angles βi and βe being defined between the radial direction Ar and, respectively, the interior lateral surface 210 of the slot and the exterior lateral surface 211 of the slot respectively.

Regardless of the configuration (FIG. 4A-4C, 5), each of the angles βi and βe can indifferently and independently be from 0° to 90°, advantageously from 0° to 45°, preferably from 1° to 45°, more preferably from 5° to 30° or in any other interval defined by two of these limits, preferably non-zero. In a particular embodiment, the angle βi can be from 5° to 90°, advantageously from 5° to 45°, preferably from 5° to 30°, or in any other interval defined by two of these limits, and the angle βe is then from 0° to 90°, advantageously from 5° to 45°, preferably from 5° to 30°, or in any other interval defined by two of these limits, preferably non-zero.

Regardless of the configuration, in absolute value, the difference between the angles βi and βe is from 0° to 90°, advantageously from 0° to 45° or from 0° to 30°, more preferably from 0° to 10°, or is in any interval defined by two of these limits. This can allow to control the guiding and exit speed of the ejected gas in order to limit the formation of turbulence at the outlet of the slot.

The values of the angles α, βi and βe can be as described above at any point along the length of a slot. These angles may or may not be constant over the length of the slot(s), preferably constant. When a slot is not adjacent to the opening of the suction chamber, these angles can be defined in the reference frame (Ar, At) relative to a direction parallel to the radial direction Ar passing through the central point C of the opening 13 of the housing (the value of the angle φ is then subtracted from the values above).

The width of a slot, denoted If, can be defined as the distance separating its interior 210 and exterior 211 lateral surfaces at the outlet orifice 212 of the slot (it is therefore measured in a plane perpendicular to the median direction Dm). This width 1*f* can be chosen depending on the gas pressure ejected by the slot and the gas ejection speed. Its value is typically from 0.1 to 20 mm, for example from 0.2 to 5 mm or in any interval comprised between two of these limits.

It may happen that a portion of the ejected gas is sucked up by the suction chamber, in particular if the distance between the outlet orifice 212 of the ejected gas and the opening 15 of the suction chamber is small and/or if the pressure difference between the volume formed by the suction chamber and the volume formed by the at least one slot is small. Furthermore, depending on the position of the gas admission orifice, the flow rate of ejected gas may not be sufficiently balanced over the entire length of the slot(s). In order to limit these effects, it is possible, in combination or not with each of the aforementioned angle values, to provide one or more of the following features:

- a variable slot width 1*f* over the entire length of the slot and/or different adjacent slot widths,
- a minimum distance between the opening 15 of the suction chamber and the outlet orifice 212 of the slot.

The slot width 1*f* can thus vary from one slot to another when several slots are present and/or along the length of one or more of the slots. This variation can be from 0% to 200% of a nominal slot width value, advantageously from 25% to 75%, advantageously from 40% to 60%, for example 50%. This nominal value of slot width can be from 0.1 to 20 mm and be chosen by simulations and/or tests. In particular, with reference to FIG. 3, the width 1*f'* of the downstream sides (parallel to the axis Aa) slots 21*a* and 21*f* located near a gas admission orifice in fluid communication with all the slots is less than the width 1*f''* of the slots 21*c* and 21*d* located near the gas suction orifice. When a slot has a variable width, this variation in width is preferably progressive over the entire length of the slot.

The width of the opening 15 of the suction chamber is typically 4 to 20 mm. The height H of a slot, measured along the median direction Dm defined above between the outlet orifice 212 of the slot and its inlet orifice 213, can advantageously be sufficiently large in order to orient the ejected gas in one main ejection direction corresponding to direction D2. For example, to properly guide the air, a minimum value of height of the slot can be 0.5 mm, a maximum value depending on the configuration of the system, in particular the position of the admission chamber when it is present. In the embodiments described, over its entire length, a slot extends in the direction Dm in a rectilinear direction between its inlet and outlet orifices. However, it could be considered that a slot extends in a slightly curved direction over at least a portion of its height and that it remains, for example, rectilinear in the immediate vicinity of its outlet orifice 212. The angles defined above are then relative to this rectilinear part. This rectilinear area in the immediate vicinity of the outlet orifice can extend over a height of at least 0.5 mm to ensure good guidance of the air.

The minimum distance between the opening 15 of the suction chamber and the outlet orifice 212 of the slot, in other words between the exterior lateral surface 140 of the suction chamber and the interior lateral surface 210 of the slot, at their opening/outlet orifice respectively, can be determined by means of simulations. For example, it could be from 0.1 to 10 mm, advantageously from 0.5 to 5 mm or in any interval defined by two of these limits.

In the embodiments shown, the opening of the at least one slot and the opening of the suction chamber are formed (in a plane perpendicular to the radial direction Ar) of rectilinear portions parallel to the sides of the housing and which extend over at least a portion of the periphery thereof. This configuration is simple to implement, however it could be possible to consider openings formed from non-rectilinear portions.

Admission Chamber

Figure 8:
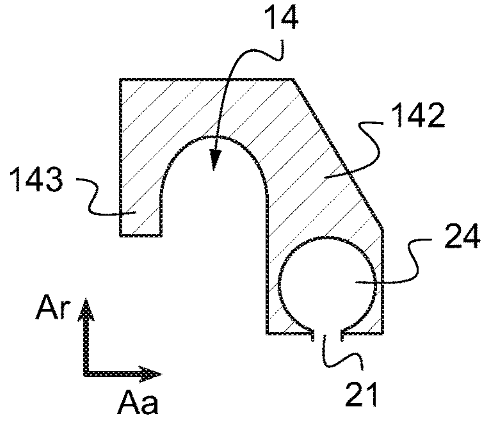
Figure 9:
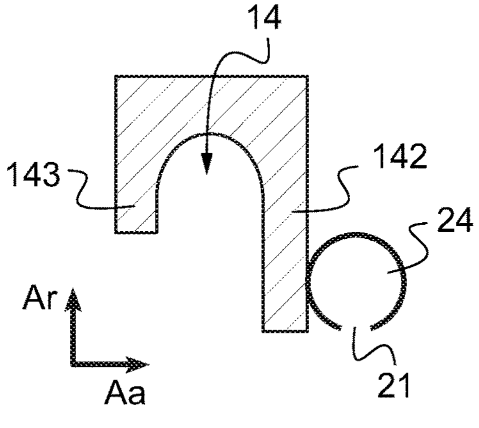

The slot(s) 21 of the gas-ejection device can be connected directly to the gas admission orifice 201. However, it is possible to advantageously provide an admission chamber 24 fluidly connected to the at least one slot and to one or more gas admission orifices. This admission chamber 24 can be fluidly connected directly to the inlet orifice 213 of the slot(s), as shown in FIGS. 8 and 9, or else be fluidly connected to the slot(s) 21 via a duct 26 (FIGS. 1-7).

Such an admission chamber 24 serves as a reservoir, which promotes maintaining a slight excess pressure relative to the pressure of the suction chamber 14. This excess pressure can be obtained by a suitable shape and dimension of the gas admission orifices 201. This overpressure is represented symbolically by the signs "++" in the figures.

In order to limit the size of the suction system and facilitate its assembly, the suction orifice 16 may be located on the side opposite the gas admission orifice 201.

The admission chamber 24 can be of any shape. It may have a section in the shape of a quadrilateral, for example with rounded corners, or of an oval or other shape. In particular, the shape of the admission chamber 24 can be variable on the periphery of the housing: the different shapes of the admission chambers 24 described with reference to the figures can thus be combined.

Generally, the admission chamber 24 is defined by at least one exterior lateral surface 240 and at least one interior lateral surface 241, which respectively form part of an exterior lateral wall 242 and an interior lateral wall 243. The interior lateral wall 243 is closest to the housing 12, the exterior lateral wall 242 is farthest from the housing 12. These lateral walls 242, 243 extend substantially parallel to the radial direction Ar and are connected by an upper wall 244 on a side opposite the slot and a lower wall 245 partially closes them in the lower portion. In the examples of FIGS. 1 to 3, the interior lateral wall 243 is formed by the exterior lateral wall 142 of the suction chamber 14, the upper walls 144 and 244 of the two chambers extending in the extension of one another (FIG. 1).

Figure 6:
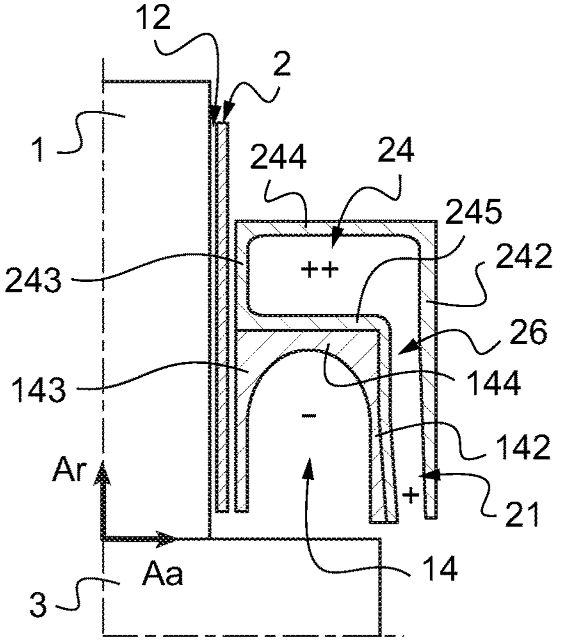
FIGS. 6 to 9 show sectional views showing different relative positions of the suction and admission chambers.
Figure 7:
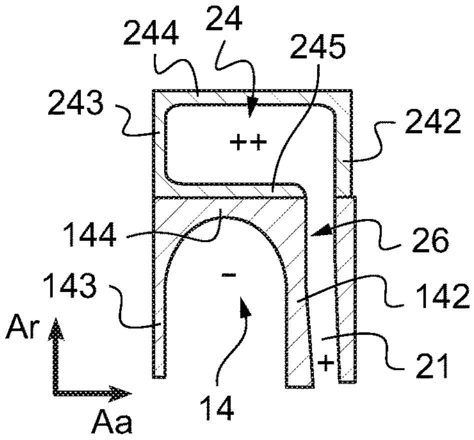

The admission chamber 24 can be positioned either laterally in relation to the suction chamber, as shown in FIGS. 1 to 3, the duct 26 can then be omitted, or else be disposed above the suction chamber (on the side opposite the opening of the suction chamber), as shown in FIGS. 6 and 7, requiring the presence of the duct 26. The duct 26 and the slot 21 can then either extend along the exterior lateral wall 142 of the suction chamber, over its entire height, as shown in FIG. 6, or else be formed in the thickness of this exterior lateral wall, as shown in FIG. 7. When the admission chamber 24 is positioned above the suction chamber 14 (in the radial direction Ar), it can partly define the housing 12, the other portion of the housing being defined by the suction chamber. The interior lateral walls 143 and 243 of the two chambers then extend in the extension of one another, in the radial direction Ar in the example of FIG. 6.

In yet another variant shown in FIG. 8, the admission chamber 24 can be integrated into the exterior lateral wall 142 of the suction chamber. The duct 26 may then be present or not, as shown.

In yet another variant shown in FIG. 9, the admission chamber 24 can be of oval or circular section and surround the suction chamber 14 in the manner of an air chamber. In this embodiment, the duct 26 is absent. This allows to further reduce the size of the gas-ejection device. The height of the admission chamber 24 can then be low.

The duct 26 thus connects the admission chamber 24 to the slot(s). It can have any shape in section along a plane containing the direction D1. It can thus be rectilinear, of constant section or not.

EXAMPLES

In the examples, the angle phi previously described and defined is zero.

Example 1

A suction system of the type shown in FIGS. 3 and 10 can have the dimensions collected in Table 1 (with reference to FIG. 3).

TABLE 1

| Suction system | Dimensions (mm) |
|---|---|
| t: tangential dimension of the brush | 12.5-50 |
| a: axial dimension of the brush | 10-40 |
| T: tangential dimension of the cage | t + 5 |
| A: axial dimension of the cage | a + 5 |
| la: width of the opening of the suction chamber, in the axial direction | 6-12 |
| La: width of the opening of the suction chamber, on the suction orifice side | 16-24 (approximately 2 × la) |
| La': width of the wall of the suction chamber, on the side opposite the suction orifice, | 0-La |
| ld: length of a discontinuity | 0.05 to 2 |
| n: number of discontinuities | 2-10 |
| % discontinuity = (ld × n)/sum of slot lengths | 0.1%-5% |

Example 2—Flow Simulations

Simulations were carried out on a suction system similar to that shown in FIGS. 3 and 10 using software developed by the company Ansys®.

The simulations were implemented with a suction system having the following features:

Brush of section 32 mm×32 mm

Slot height: 2 mm

Slot: βi=18.43°; βe=29.05°, α=23.74°

Slot of constant width: 2 mm

Vacuum in the suction chamber: −50 mbar

Pressure in the admission chamber: 100 mbar

Figure 11:
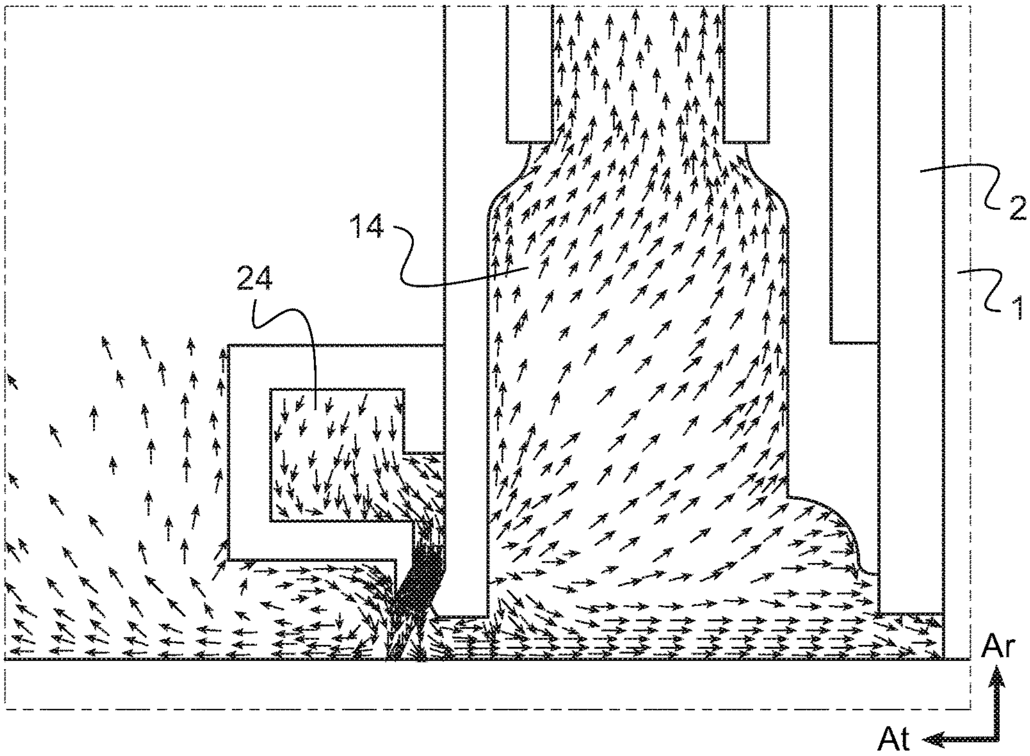
FIGS. 11 and 12 show the gas flows of a suction system according to one embodiment of the invention.
Figure 12:
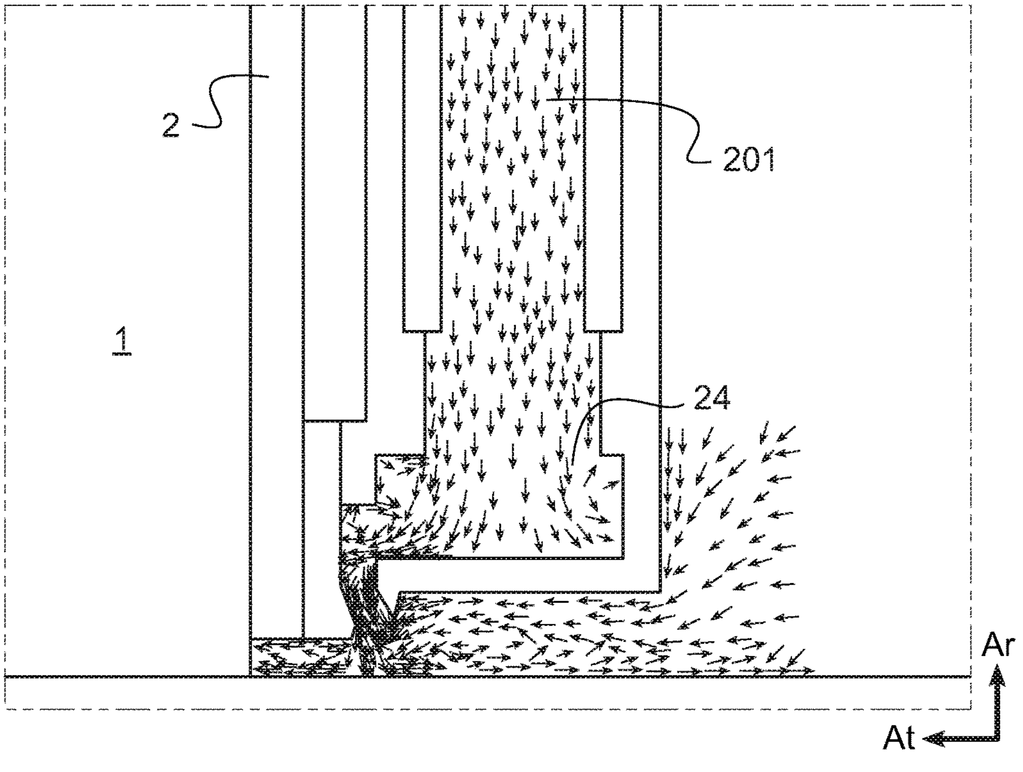

As shown by the flows in FIGS. 11 and 12, the air curtain generated pushes back the outside air so that the latter is not sucked up. Thus, any pollution present in the air surrounding the suction system is not sucked up. It is noted that a small portion of the air curtain generated is sucked up, but that this portion is too weak to destabilise the air curtain and take with it the surrounding air and its pollution.

The invention claimed is:

1. A suction system-intended to suck up dust generated by a brush rubbing against a rotary element of a rotating electric machine without sucking up the surrounding air, the system comprising:

a through housing extending in a guiding direction (D1) and capable of receiving a brush or a brush holder in said guiding direction, a suction chamber having an opening intended to face the rotary element, said opening extending over at least a portion of the periphery of a lower end of the housing intended to be positioned facing the rotary element, a gas-ejection device comprising at least one slot opening out from the side of the lower end of the housing, the at least one slot extending around the lower end of the housing over at least a portion of the periphery of the latter and around at least a portion of the opening of the suction chamber, characterised in that the at least one slot is oriented in a direction away from the opening of the suction chamber to direct a gas flow exiting through the at least one slot in a direction away from the opening of the suction chamber.

2. The suction system according to claim 1, characterised in that the at least one slot extends over the entire periphery of the lower end of the housing.

3. The suction system-according to claim 1, characterised in that:

the at least one slot is defined by an interior lateral surface and an exterior lateral surface-disposed facing each other, the at least one slot is configured so that, over the entire length of the at least one slot, in each plane perpendicular to the interior and exterior lateral surfaces of the at least one slot and parallel to a radial direction of the rotary element passing through a central point of a lower opening of the housing when the suction system is mounted on the electric machine, an angle α formed between a direction parallel to the radial direction and a median slot direction is from 0° to 90°-phi, optionally from 1° to 50°-phi, this median slot direction being defined as a median straight line of two segments formed by the intersection of said plane with the interior and exterior lateral surfaces of the slot, phi designating an angle less than or equal to the angle between the direction parallel to the radial direction and the median direction of the slot.

4. The suction system-according to claim 1, characterised in that:

the at least one slot is defined by an interior lateral surface and an exterior lateral surface disposed facing each other, and, in each plane perpendicular to the interior and exterior lateral surfaces of the at least one slot and parallel to a radial direction of the rotary element passing through a central point of a lower opening of the housing when the suction system is mounted on the electric machine:

a first angle βi is formed between a direction parallel to the radial direction and the interior lateral surface of the at least one slot, a second angle βe is formed between a direction parallel to the radial direction and the exterior lateral surface of the at least one slot, and each of the first and second angles is, independently, from 0° to 90°-phi, optionally from 0° to 45°-phi, phi designating an angle less than or equal to each of the first and second angles.

5. The suction system according to claim 1, characterised in that the at least one slot has a width of 0.1 to 20 mm.

6. The suction system according to claim 1, characterised in that it comprises at least one of the following features:

the at least one slot has a variable width along its length, at least two distinct slots have different widths.

7. The suction system according to claim 6, characterised in that it comprises at least one of the following features:

a portion of the at least one slot closest to a gas admission orifice supplying the at least one slot is narrower than the rest of the at least one slot and/or than an adjacent slot, a portion of the at least one slot closest to a gas suction orifice of the suction chamber is wider than the rest of the at least one slot and/or than an adjacent slot.

8. The suction system according to claim 1, characterised in that the gas ejection device comprises at least two slots disposed in the extension of one another and in that the sum of the distances separating two adjacent slots is 0.1 to 5% of the sum of the lengths of the slots.

9. The suction system according to claim 1, characterised in that the gas-ejection device comprises at least one gas admission orifice in fluid communication with the at least one slot.

10. The suction system according to claim 1, characterised in that the gas-ejection device comprises a gas admission chamber fluidly connected to the at least one slot and to at least one gas admission orifice.

11. The suction system according to claim 10, wherein the admission chamber is adjacent to the suction chamber and extends, at least partly, along an exterior lateral wall of the suction chamber and/or along an upper wall of the suction chamber.

12. The suction system-according to claim 10, characterised in that the gas-ejection device and the suction chamber are separate parts assembled together.

13. The suction system according to claim 1, characterised in that the gas-ejection device is formed of at least two distinct portions assembled together, a portion defining an exterior lateral surface of the at least one slot and the other portion defining an interior lateral surface of the at least one slot.

14. A method for sucking up dust generated by a brush rubbing against a rotary element of a rotating electric machine without sucking up the surrounding air by means of a suction system according to claim 1, wherein, at least during the suction of gas through the suction chamber, the at least one slot of the suction system is supplied with a volume flow rate of gas sufficient to form a gas curtain isolating the opening of the suction chamber from the surrounding air.

15. The dust suction method according to claim 14, characterised in that said at least one slot is supplied with gas via a gas admission chamber connected to at least one gas admission orifice.

16. The dust suction method according to claim 15, characterised in that the gas pressure inside the admission chamber is greater than the gas pressure inside the suction chamber, optionally by at least 150 mbar.

17. The dust suction method according to claim 1, characterised in that the dust-laden gas contained in the suction chamber is sucked up by means of a suction group and at least a portion of the gas thus sucked up is used after passing through a filtration system to supply the at least one slot of the suction system.

18. A rotating electric machine comprising at least one brush rubbing against a rotary element and equipped with at least one suction system according to claim 1, said brush being received in the housing of the suction system following the guiding direction (D1).

* * * * *